United States Patent [19]

Shaner

[11] 4,083,580
[45] Apr. 11, 1978

[54] BUSHING ASSEMBLY

[76] Inventor: Robert J. Shaner, Circle G Mobile Home Park, Lot 13, R.D. 4, Kittanning, Pa. 16201

[21] Appl. No.: 694,404

[22] Filed: Jun. 9, 1976

[51] Int. Cl.² ............................................. B60G 11/18
[52] U.S. Cl. ..................................... 280/689; 267/57; 308/74
[58] Field of Search ...................... 280/689, 695, 700; 308/74, 237 R; 267/57

[56] References Cited

U.S. PATENT DOCUMENTS

| 2,560,413 | 7/1971 | Carlson | 308/74 |
| 2,648,580 | 8/1953 | Lignian | 308/237 R |
| 2,706,114 | 4/1955 | Castello | 308/237 R |
| 3,315,952 | 4/1967 | Vittone | 280/689 |
| 3,448,994 | 6/1969 | King | 280/689 |
| 3,476,450 | 11/1969 | Grange | 308/74 |
| 3,939,779 | 2/1976 | Pringle | 267/57 |

FOREIGN PATENT DOCUMENTS 533,159  2/1941  United Kingdom ................. 280/689

Primary Examiner—Joseph F. Peters, Jr.
Assistant Examiner—John A. Carroll
Attorney, Agent, or Firm—Arnold B. Silverman

[57] ABSTRACT

An automotive vehicle stabilizer bar assembly including an elongated stabilizer bar and a cooperating stabilizing bar bushing defining a bore through which the stabilizer bar passes. The bushing has upper and lower bushing elements which are substantially rigid and the upper and lower elements are secured in relative fixed position. Securing may be effected by at least two pairs of aligned openings in the upper and lower bushing elements and elongated pins extending into said openings. Clamp members may secure the bushing to a support member.

In one embodiment, separate pin elements pass through the aligned openings in the upper and lower bushing members. In another embodiment, pin elements are formed integrally with at least one of the bushing elements. The bore defining portions of the bushing may have serrations in order to increase intimacy of contact between the bushing and the stabilizer bar.

23 Claims, 22 Drawing Figures

U.S. Patent     April 11, 1978     Sheet 1 of 3     4,083,580
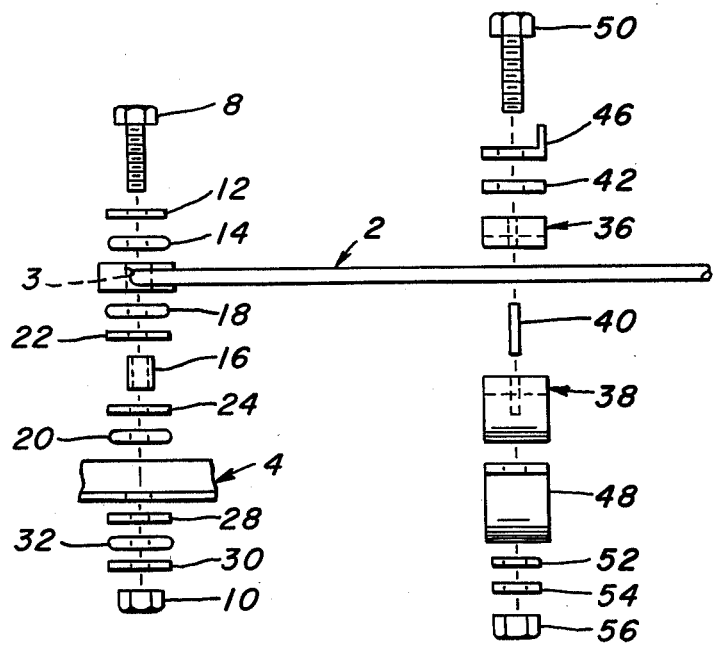
FIG. 1.
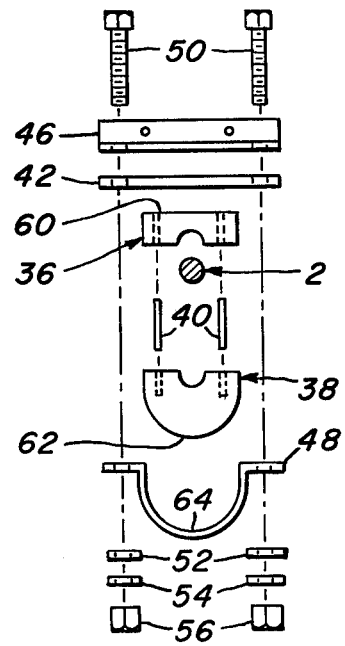
FIG. 2.
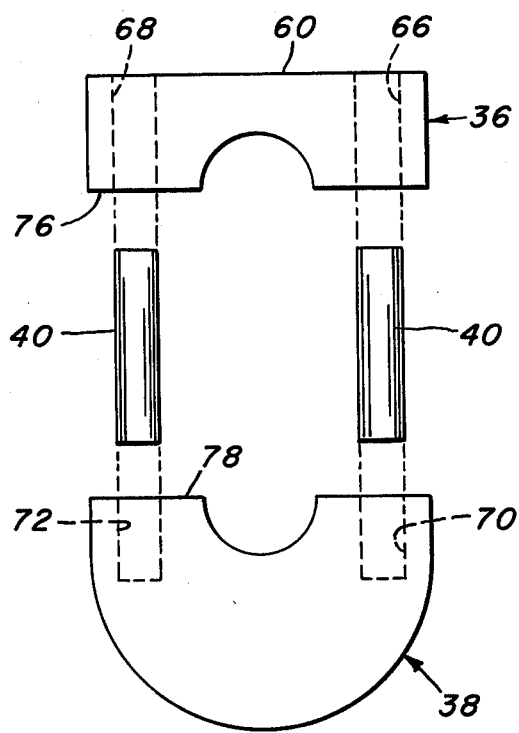
FIG. 3.
FIG. 1a.
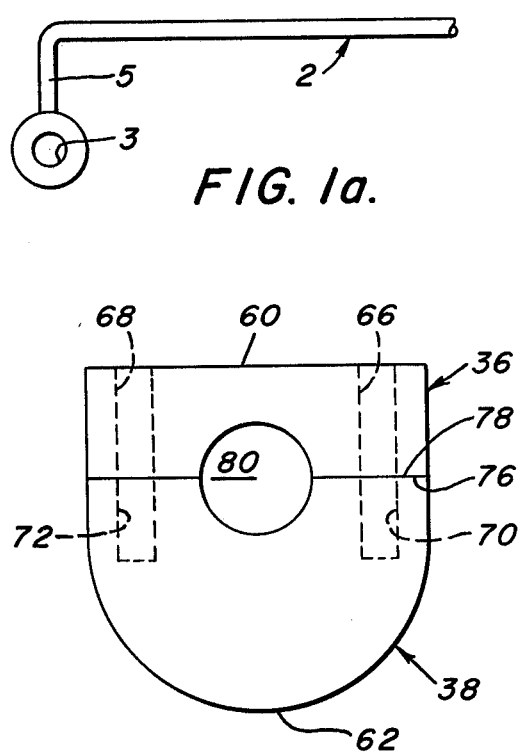
FIG. 4.

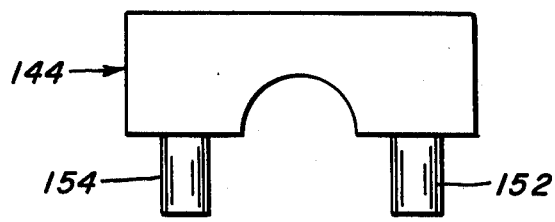
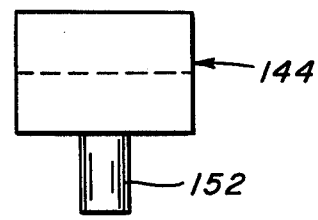
FIG. 18.                FIG. 20.
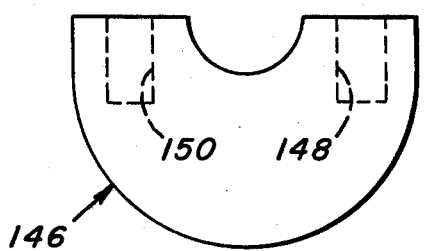
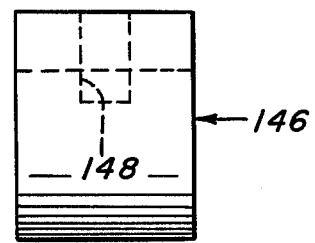
FIG. 19.                FIG. 21.
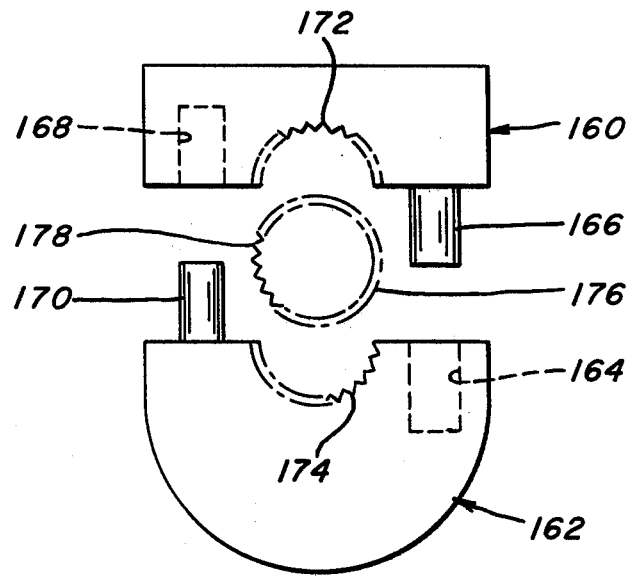
FIG. 22.

4,083,580

BUSHING ASSEMBLY

BACKGROUND OF THE INVENTION

1. Field of the Invention

This invention relates to bushings for automotive vehicle stabilizer bars, and, more specifically, to such bushings which are adapted to provide improved performance through superior ability to withstand higher imposed force loads.

2. Description of the Prior Art

Stabilizer bars or, as they are sometimes known, sway bars are generally steel bars which are employed near an axle of an automotive vehicle in order to resist excessive sway when the vehicle is turning. It has been known to employ unitary resilient rubber sleeves as bushings for such stabilizer bars as such bushings are inexpensive and can satisfy many requirements in respect of passenger comfort and minimum force absorbing characteristics.

A number of problems exist in connection with such known rubber bushings. First of all, their unitary construction renders it necessary to replace them by a very cumbersome technique requiring removal of the bar and mounting parts (and, in some cases other suspension parts) and involving longitudinal sliding of the bushing along the length of the stabilizer bar. More significantly, in view of the compressive nature of the rubber material, when the stabilizer bar is acted upon by the types of forces encountered in normal operation, the resiliency and compressibility of the rubber material tends to cause shifting and compression of the bushing thereby resulting in the force imposed upon the stabilizer bar creating undesired excessive movement of the bar.

There remains, therefore, a need for a stabilizer bar bushing which will provide improved resistance to forces imposed upon the stabilizer bar as well as permitting ready replacement thereof.

SUMMARY OF THE INVENTION

The present invention has solved the above-described problem by providing a multi-piece substantially rigid bushing element which is adapted to create improved resistance to forces imposed upon the stabilizer bar and thereby contribute to more effective stabilizer bar performance. In addition, the multi-piece construction permits ready assembly and disassembly without the need for relative longitudinal movement between the bushing and the stabilizer bar.

The assembly of the present invention includes upper and lower bushing elements which are substantially rigid and define a bore which receives the stabilizer bar. Joining means secure the upper and lower elements in relative fixed position, and clamp means may secure the bushing to a support member. The joining means may conveniently take the form of pin elements which extend through and frictionally interfit with aligned openings in the bushing elements.

Depending upon the particular service contemplated and the requirements of the specific use, different advantageous features of different embodiments of the invention may be employed. For example, where it is desired to have local stress concentration at the interface between the stabilizer bar and the bore defining portion of the bushing, serrations may be provided on the surface of the bore defining portions of the bushing for engagement with the cylindrical surface of the stabilizer bar. Alternatively, the bar may also be provided with serrations which interengage with the bore defining wall serrations or an unserrated bore defining wall.

It is an object of the present invention to provide an automotive vehicle stabilizer bar assembly which includes a multi-piece, substantially rigid bushing element assembly adapted to provide increased resistance to forces imposed upon the bushing by the stabilizer bar.

It is another object of the present invention to provide such a bushing which is readily adapted for rapid and easy assembly and disassembly.

It is another object of the invention to provide such a stabilizer bar assembly which will afford effective bushing performance over extended use and extended time periods without meaningful deterioration in the bushing.

It is another object of the invention to provide a bushing which affords improved resistance to torsional forces applied to the stabilizer bar and improves the effectiveness of the interengagement between the bushing and stabilizer bar.

These and other objects of this invention will be understood from the following description of the invention on reference to the illustrations appended hereto.

BRIEF DESCRIPTION OF THE DRAWINGS

FIG. 1 is an exploded, fragmentary view of a form of stabilizer bar assembly of the present invention.

FIG. 1a is a top plan view of the stabilizer bar shown in FIG. 1.

FIG. 2 is an exploded view showing a portion of the bushing assembly shown in FIG. 1 as viewed from the right side.

FIG. 3 shows an exploded view of the bushing assembly elements of the present invention.

FIG. 4 shows the bushing assembly elements of FIG. 3 (without the joining means) in assembled position.

FIG. 18 illustrates a front elevational view of a modified form of upper bushing element having integral pin elements.

FIG. 19 illustrates a lower bushing element.

FIG. 20 is a right-side elevational view of the upper bushing element shown in FIG. 18.

FIG. 21 illustrates a right-side elevational view of the lower bushing element shown in FIG. 19.

FIG. 22 illustrates an exploded view of another embodiment of the invention wherein the stabilizer bar has serrations, and each bushing element has one pin and one opening.

DESCRIPTION OF THE PREFERRED EMBODIMENTS

Figure 5:
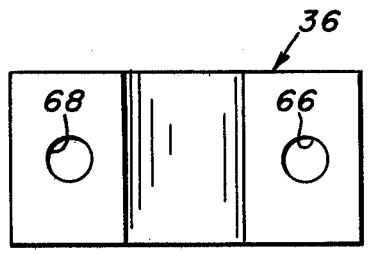
FIG. 5 is a bottom plan view of the upper bushing element shown in FIGS. 3 and 4.

As used herein the expression "automotive vehicle" shall refer to power driven wheeled land vehicles including but not limited to automobiles, trucks and railroad cars.

Referring now more specifically to FIGS. 1 and 1a, there is shown a stabilizer bar or sway bar 2 which generally will be of substantially cylindrical cross-sectional configuration. The left-hand portion of the sway bar in the form shown is secured to the lower pivoting arm of the suspension system. This member is generally referred to as the control arm or A-arm 4. This securement may be effected in any conventional fashion or other desired reliable fashion. In the form shown, a bolt 8 passes through opening 3 in the offset portion 5 of sway bar 2 and A-arm 4 and is secured to nut 10. A retainer 12 and grommet 14 are interposed between the head of the bolt 8 and the stabilizer bar 2. A spacer 16 is interposed between the stabilizer bar 2 and the A-arm 4 with grommets 18, 20 and retainers 22, 24 being provided. Retainers 28, 30 and grommet 32 are interposed between A-arm 4 and nut 10. The retainers 12, 28, 30 may conveniently be form fit washers, and the grommets 14, 18, 20 may conveniently be composed of resilient rubber or plastic.

Referring still to FIG. 1, the bushing assembly will now be considered. As is shown in FIG. 1, an upper bushing element 36 cooperates with a lower bushing element 38 and a retainer pin 40. (Actually, in the form illustrated a pair of retainer pins 40 is employed, but only one is illustrated in FIG. 1.) Above upper bushing element 36 is a substantially flat plate 42 which is adapted to have a lower surface in surface-to-surface engagement with upper bushing element 36. A support plate 46 overlies plate 42 and is secured to a portion of the frame (not shown) such as the lower frame tube, for example. Underlying lower bushing element 38 is a clamp member 48. The assembly is secured, in the form shown, by bolt 50 (Actually two bolts, but only one is shown in FIG. 1.), which passes through the assembly and through washer 52, lock washer 54 and into nut 56.

Referring now to FIG. 2, the bushing assembly shown in FIG. 1 is illustrated in side view. As is seen in FIG. 2, the stabilizer bar 2, is adapted to be received within a bore which is defined in part by each bushing element 36, 38 and with the bore being of generally complementary configuration with respect to the stabilizer bar 2. Also shown in FIG. 2, upper bushing element 36 has a generally flat upper surface 60, and lower bushing element 38 has a generally outwardly convex lower surface 62. The clamp member 48 is generally U-shaped and defines an upwardly open recess 64 which is adapted to receive lower bushin element 38 and is preferably of generally complementary configuration and size with respect thereto.

Referring still to FIG. 2, it will be appreciated that by means of bolts 50 and nuts 56, the bushing assembly will be retained in intimate contact with the sway or stabilizer bar 2 and with the vehicle. Pins 40 may merely be loosely fitted within openings (not shown in FIGS. 1 and 2) in the bushing elements 36, 38 in order to resist undesired relative movement therebetween with the clamp member 48 and its associated retaining elements serving to prevent relative separation of the two bushing elements 36, 38. In the preferred form, however, the pins 40 will be in frictional interengagement with the aligned openings in the bushing elements 36, 38 to provide an effective press fit, thereby contributing more positively to retention of the assembly. Pins 40 may conveniently be frictionally interfitted into openings in bushing element 36 prior to bushing assembly.

Referring now to FIG. 3, it is seen that the upper bushing element 36 has openings 66, 68 extending entirely therethrough. Lower bushing element 38 has openings 70, 72 extending partially therethrough. These openings 66, 68, 70, 72 as well as pins 40 may conveniently be of generally cylindrical configuration. One pin 40 is adapted to be received within aligned openings 66, 70 and the other pin 40 is adapted to be received within aligned openings 68, 72. The pins 40 are preferably of such length that when seated within the aligned openings with the bushings 36, 38 in relative assembled or closed positions, the pins will not project appreciably beyond upper surface 60 of upper bushing element 36.

Referring to FIG. 4, there is shown upper bushing element 36 and lower bushing element 38 in relative assembled position without the pins 40 (FIGS. 1-3) or stabilizer bar 2 (FIG. 1) being shown. It is noted that lower surface 76 of upper bushing element 36 is in surface-to-surface contact with upper surface 78 of lower bushing element 38. In a preferred form, the surfaces 76, 78 will meet adjacent to the longitudinal central axis of bore 80. The two bushing elements 36, 38 cooperate to define a cylindrical bore 80 which is adapted to receive the stabilizer bar 2 (not shown in this view). In a preferred embodiment, the dimensions of the bore 80 with respect to the dimensions of the stabilizer bar 2 will be such that intimate circumferential surface-to-surface engagement will be effected.

Figure 7:
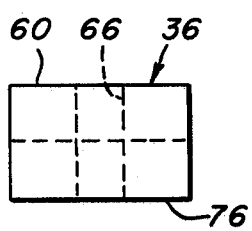
FIG. 7 is a right-side elevational view of the upper bushing element shown in FIG. 5.
Figure 6:
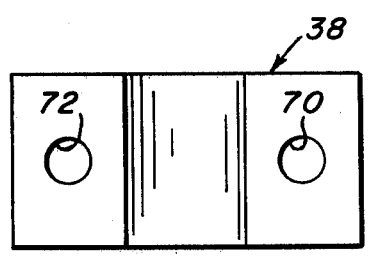
FIG. 6 is a plan view of the lower bushing element shown in FIGS. 3 and 4.
Figure 8:
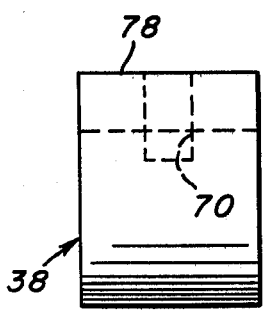
FIG. 8 is a riht-side elevational view of the lower bushing element shown in FIG. 6.

FIGS. 5 and 7, respectively, show a bottom plan view and right-side elevation of the upper bushing element 36. Similarly, FIGS. 6 and 8, respectively, show plan and right-side elevational views of lower bushing element 38. It is noted that one pair of aligned openings 66, 70 is disposed on the other side of bore 80 with respect to the other pair of aligned openings 68, 72, and that the aligned openings 66-70 and 68-72 are oriented generally transversely with respect to the longitudinal direction of the bore. Also, in the form shown, please note that the openings 70, 72 extend less than about one-half the depth of bushing element 38.

Figure 9:
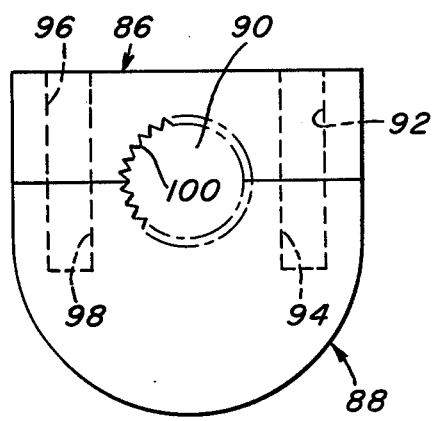
FIG. 9 illustrates a modified embodiment of the bushing assembly elements provided with bore defining surface serrations.

Referring now to FIG. 9, another embodiment of the invention will be considered. In this form of the invention, the upper bushing element 86 and lower bushing element 88 are generally of the same configuration as in the prior embodiment with one exception which will be discussed below. The bushing elements 86, 88 have aligned openings 92-94 and 96-98 which are adapted to receive retainer pins (not shown in this view). The inner bore defining surfaces of the bushing elements 86, 88 are provided with generally radially inwardly directed serrations 100. These serrations are in contact with stabilizer bar 90. This form of contact serves to provide for improved grip and torsion resistance as a result of the stress concentration provided where the elongated serrated edges come in contact with the cylindrical surface of the stabilizer bar 90.

Figure 10:
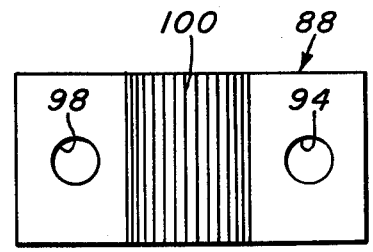
FIG. 10 is a top plan view of the lower bushing element shown in FIG. 9.
Figure 14:
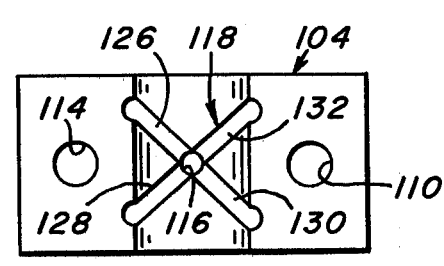
FIG. 14 is a top plan view of the lower bushing element shown in FIG. 11.
Figure 11:
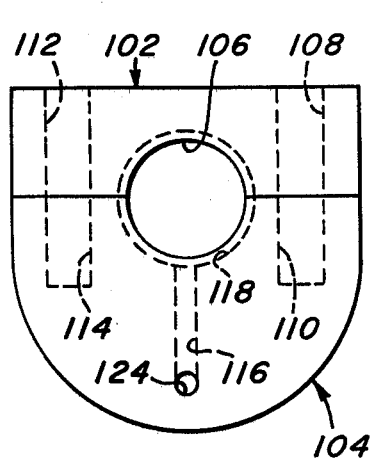
FIG. 11 illustrates a further modified embodiment of the present invention employing bushing assembly elements with lubricant supply channels.
Figure 17:
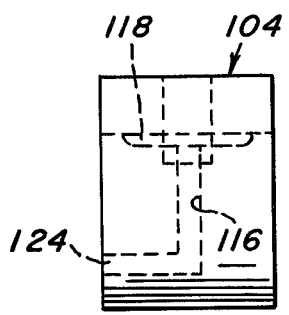
FIG. 17 is a right-side elevational view of the lower bushing element shown in FIG. 15.

Referring now to FIG. 10, there is shown a plan view of lower bushing element 88 illustrating the serrations 100. It is noted, as is preferred, that the serrations 100 are longitudinally substantially continuous and coextensive with the bushing element 88. The same preference exists in connection with element 86. In some installations, it is of consequence that the bushing not bind the stabilizer bar, but rather permit limited relative rotational movement between the stabilizer bar and the bushing while the bushing still serves to provide support and resistance to torque action on the bar. Where such an arrangement is desired, it is preferred to provide means for introducing lubricant into the bore of the bushing. As is shown in FIG. 11, upper bushing element 102 cooperates with lower bushing element 104 to define bore 106. These bushings have a first pair of aligned openings 108–110, a second pair of aligned openings 112–114 disposed on opposite sides of bore 106. In order to provide means for introducing lubricating material into bore 106, the lower bushing element is provided with primary channel means 116, which cooperate with secondary channel means 118 in lower bushing element 104 and secondary channel means 120 in upper bushing element 102. As is shown in FIG. 17, the primary lubricant carrying channel 116 has an opening 124 is communication with the exterior of the lower bushing element 104. This opening 104 may conveniently be tapped for cooperative use with a suitable type grease fitting. One suitable type of grease fitting is that marketed under the trademark "Zerk" or "Zurn". It has an axial bore closed at one end by a spring mounted valve element which opens responsive to application of lubricant under pressure to permit flow of lubricant therethrough. The inner extremity of primary channel 116 is in communication with secondary channel 118. As is shown in the plan view of FIG. 14, secondary channel 118 in the form illustrated is of generally X-shaped configuration in plan. Lubricant entering through primary channel 116 will move generally radially outwardly along legs 126, 128, 130, 132 of secondary channel 118.

Figure 12:
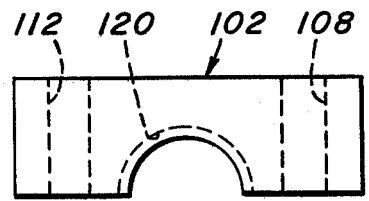
FIG. 12 is a front elevational view of the upper bushing element shown in FIG. 11.
Figure 16:
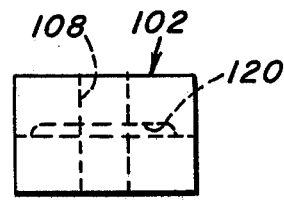
FIG. 16 is a right-side elevational view of the upper bushing element shown in FIG. 12.
Figure 15:
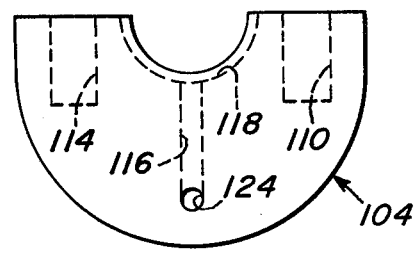
FIG. 15 is a front elevational view of the lower bushing element shown in FIG. 11.
Figure 13:
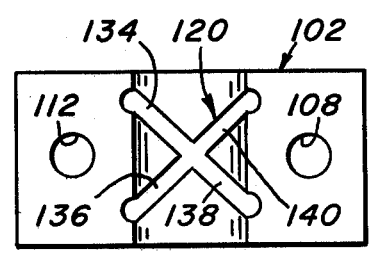
FIG. 13 is a bottom plan view of the upper bushing element shown in FIG. 12.

Looking now at FIG. 13, it is seen that secondary channel 120 of upper bushing element 102 is also generally X-shaped in plan and has radially oriented legs 134, 136, 138, 140. The outer extremities of legs 126, 128, 130, 132 will be in communication with the outer extremities of legs 136, 134, 140, 138, respectively, in the assembled bushing and secondary channel 120 will receive lubricant therefrom. In this fashion, lubricant introduced into main channel 116 through opening 124 will be delivered to the bore 106. Further details of the upper bushing element are shown in FIGS. 12 and 16.

Referring now to FIGS. 18 and 19, a further embodiment of the invention will be considered. As is shown in these figures, upper bushing element 144 is adapted to be joined to lower bushing element 146. Lower bushing element 146 contains openings 148 and 150 similar to those illustrated in connection with the previous embodiments. Upper bushing element 144, however, in lieu of openings therethrough for receipt of separately formed pins, contains integrally formed projecting pin elements 152, 154 which are adapted to be received in openings 148, 150, respectively. Side elevational views of these elements 144, 146 are shown in FIGS. 20 and 21. This embodiment provides the advantage of reducing the number of pieces which must be fabricated and assembled in order to establish the bushing assembly of the present invention.

Referring now to FIG. 22, several further refinements of the invention will be considered. This figure has been employed to show two distinct features which may be employed independent of one another. It is seen that upper bushing element 160 cooperates with lower bushing element 162 to provide a bushing generally of the type described above. In the present embodiment, upper bushing element 160 has an integrally formed pin 166 which is adapted to be received within opening 164 of lower bushing element 162. Similarly, lower bushing element 162 has integrally formed upwardly projecting pin 170 which is adapted to be received within opening 168 of upper bushing element 160.

Continuing to refer to FIG. 22, it is noted that bushing elements 160, 162 contain serrated, bore defining surfaces 172, 174. In this embodiment of the invention, however, stabilizer bar 176 also has serrations 178 which are adapted to be interengaged with the serrations on surfaces 172, 174. This feature of this embodiment is adapted for use where extremely high gripping and torsion resisting capabilities are required.

With regard to the materials out of which the bushing components of the present invention may be made, a wide variety of substantially rigid materials may be employed. It is preferred that these materials be metals. Among the preferred metals are those selected from the group consisting of aluminum and brass. The members may be made of steel, if desired, or other suitable materials possessing sufficient strength and durability as to perform advantageously in this environment. Also, non-metallic materials having suitable strength and the desired rigidity may be employed. For example, synthetic resins obtained by condensation of formaldehyde with phenols, such as that sold under the trademark "Bakelite" may be employed. Also, tetrofluoroethylene fluorocarbon polymer materials such as that sold under the trademark "Teflon", for example, may be employed. Depending upon the material employed, the individual elements may advantageously in many instances be made by casting or extrusion with subsequent machining. In the event that dissimilar materials are employed in combination, it may be desirable to provide suitable protective coatings or other protective means in order to resist undesired galvanic corrosion. For example, aluminum may be anodized or subjected to application of a protective coating in any other convenient fashion.

EXAMPLE

In order to consider a specific form of bushing assembly construction and how it might be made, the following example is provided. A bushing assembly of the type shown in FIGS. 3 and 4 may be constructed by providing a brass block having the dimensions 1¾ inches by 1¾ inches by 1 5/16 inches. The lower surface is planed in order to provide the desired convex curvature for what will be the lower bushing element. At the position where the stabilizer bar receiving bore is to be placed, assuming a 9/16 inch diameter bore is desired, the bore is established by boring a hole through the entire 1 5/16 inch depth. The center of the bore, in this particular example, is located ⅝ inch down fron what will be the upper surface of the upper bushing element. It is located midway between lateral vertical surfaces of the bushing. On opposite sides of the bore, spaced 19/64 inch from the lateral edges, pin receiving holes are drilled to a ¼ inch diameter and depth of 1 inch, drilling from what will be the upper surface of the upper bushing element. The block is then severed along a path parallel to the upper surface of the upper bushing element and passing through the center of the bore. Alignment pins, ¾ inches long and ¼ inch in diameter, may be made by severing segments of steel rod. The pins are frictionally press fit into the pin receiving holes to join the assembly. If desired or necessary, suitable finishing of the surfaces of these parts, either for appearance or protective purposes, may then be effected.

It will be appreciated, therefore, that the stabilizer bar assembly of the present invention provides for improved gripping, resistance to various torsional forces, and, where desired, internal lubrication. All of this is accomplished in an efficient manner which provides a durable and dependable construction. Also, the bushing assembly is adapted for ready disassembly without the need for cumbersome disassembly of bar mounting parts, suspension parts and lonitudinal sliding of the bushing along the stabilizer bar. It will further be appreciated that the various refinements of the invention permit additional, advantageous performance characteristics depending upon the particular end use environment in which the bushing will be used, and the desired properties.

While throughout the application, for convenience of reference, terms such as "upper," "lower," "inner" and "outer" have been employed. It will be appreciated that these terms are employed solely for simplicity and clarity of reference and are not deemed to be a limitation upon the invention in the absence of specific language expressly indicating to the contrary.

The particular type of stabilizer bar disclosed herein forms no part of the invention per se, and the invention is adapted for use with a wide variety of stabilizer bars and other automotive vehicle members. While for purposes of simplicity of disclosure of the best mode of practicing the present invention, the disclosure has focused upon the preferred use in connection with an automotive vehicle stabilizer bar; it will be appreciated that the invention may be employed advantageously in other automotive vehicle uses where the structural and property needs make such a bushing assembly desirable.

Whereas particular embodiments of the invention have been described above for purposes of illustration, it will be appreciated by those skilled in the art that numerous variations of the details may be made without departing from the appended claims.

Having thus described my invention and certain embodiments thereof, I claim:

1. An automotive vehicle stabilizer bar assembly comprising,
    an elongated stabilizer bar,
    a stabilizer bar bushing assembly defining a bore which said stabilizer bar contacts and through which said stabilizer bar passes,
    said stabilizer bar bushing assembly having an upper element, a lower element and joining means securing said upper and lower elements in relative fixed position,
    said upper and said lower bushing elements being substantially rigid,
    said joining means including at least two pairs of aligned openings in said upper and said lower bushing elements and elongated pins extending into said openings,
    said upper and lower bushing elements cooperating to define said bore,
    said aligned openings being disposed on opposite sides of said bore and being oriented generally transversely with respect to said bore, and
    clamp means securing said bushing to a support member on said automotive vehicle, whereby said bushing assembly bore defined by said upper and said lower bushing elements will provide a substantially rigid bushing member in intimate contact with said stabilizer bar.

2. The stabilizer bar assembly of claim 1 including,
    said upper bushing element having a pair of said pin receiving openings extending completely therethrough,
    said lower bushing element having a pair of said openings extending partially therethrough, and
    a said pin extending into and frictionally engaging each said pair of aligned openings.

3. The stabilizer bar assembly of claim 1 including said bushing having a serrated inner surface defining said bore.

4. The stabilizer bar assembly of claim 3 including said stabilizer bar having serrations interengaged with said bushing serrations.

5. The stabilizer bar assembly of claim 3 including said stabilizer bar having a generally cylindrical cross-sectional configuration with said bushing serrations being in intimate contact therewith.

6. The stabilizer bar assembly of claim 1 including channeel means in communication with both said bushing bore and the exterior of said bushing, whereby flowable materials may be introduced into the bushing bore from the exterior of said bushing through said channel means.

7. The stabilizer bar assembly of claim 6 including,
    said channel means including a main channel and a secondary channel means,
    said secondary channel means having at least one recess in the bore defining portion of said bushing, and said main channel extending from the exterior of said bushing to said secondary channel means.

8. The stabilizer bar assembly of claim 7 including said secondary channel means being of generally X-shaped configuration in plan.

9. The stabilizer bar assembly of claim 1 including,
    said joining means including at least two pin members formed integrally with said bushing elements, and
    at least two said openings in said bushing elements receiving said pin members.

10. The stabilizer bar assembly of claim 9 including said bushing bore having a shape which is generally complementary to the shape of the adjacent portion of said stabilizer bar.

11. The stabilizer bar assembly of claim 9 including said bushing bore having generally radially inwardly projecting serrations in contact with said stabilizer bar.

12. The stabilizer bar assembly of claim 11 including said stabilizer bar having generally radially outwardly projecting serrations in engagement with said bushing serrations.

13. The stabilizer bar assembly of claim 2 including,
    said upper bushing element having a generally flat upper surface, and
    said lower bushing element having a generally outwardly convex lower surface.

14. The stabilizer bar assembly of claim 9 including,
    said integrally formed pin members being disposed on one said bushing element and said openings for receiving said integrally formed pin members being disposed on the other said bushing element.

15. The automotive vehicle bushing assembly of claim 1 including
   said upper bushing element being unitary, and
   said lower bushing element being unitary.

16. An automotive vehicle bushing assembly comprising
   a multi-piece bushing assembly defining a bore for receiving and contacting an automotive vehicle stabilizer bar,
   said bushing assembly having an upper element, a lower element and joining means securing said upper and lower elements in relative fixed position,
   said upper and said lower bushing elements being substantially rigid,
   said joining means including at least two pairs of aligned openings in said upper and said lower bushing elements, elongated pins extending into said openings,
   said upper and lower bushing elements cooperating to define said bore, and
   said alinged openings being disposed on opposite sides of said bore and being oriented generally transversely with respect to said bore, whereby said bushing assembly bore defined by said upper and said lower bushing elements will provide a substantially rigid bushing member.

17. The automotive vehicle bushing assembly of claim 16 including,
   said upper bushing element having a pair of said pin receiving openings extending completely therethrough,
   said lower bushing element having a pair of said openings extending partially therethrough, and
   a said pin extending into and frictionally engaging each said pair of aligned openings.

18. The automotive vehicle bushing assembly of claim 16 including said bushing having a serrated inner surface defining said bore.

19. The automotive vehicle bushing assembly of claim 16 including channel means in communication with said bushing bore and the exterior of said bushing, whereby flowable materials may be introduced into the bushing bore from the exterior of said bushing by means of said channel means.

20. The automotive vehicle bushing assembly of claim 17 including,
   said upper bushing element having a generally flat upper surface, and
   said lower bushing element having a generally outwardly convex lower surface.

21. The automotive vehicle bushing of claim 19 including,
   said channel means including a main channel and secondary channel means,
   said secondary channel means being a recess in the bore defining portion of said bushing, and said main channel extending from the exterior of said bushing to said secondary channel means.

22. The automotive vehicle bushing assembly of claim 16 including,
   said joining means including at least two pin members formed integrally with said bushing elements, and
   at least two said openings in said bushing elements receiving said pin members.

23. The automotive vehicle bushing assembly of claim 16 including
   said upper bushing element being unitary, and
   said lower bushing element being unitary.

* * * * *

UNITED STATES PATENT OFFICE
CERTIFICATE OF CORRECTION

PATENT NO. : 4,083,580
DATED : April 11, 1978
INVENTOR(S) : Robert J. Shaner

It is certified that error appears in the above-identified patent and that said Letters Patent are hereby corrected as shown below:

Column 2, line 43 change "riht" to -- right --

Column 3, line 33 change "form fit" to -- form-fit --

Column 3, line 63 change "bushin" to -- bushing --

Column 6, line 63 change "fron" to -- from --

Column 7, line 19 change "lonitudinal" to -- longitudinal --

Column 8, line 29 change "channeel" to -- channel --

Column 9, line 23 change "alinged" to -- aligned --

Signed and Sealed this

Fifth Day of September 1978

[SEAL]

Attest:

RUTH C. MASON
*Attesting Officer*

DONALD W. BANNER
*Commissioner of Patents and Trademarks*